Nov. 3, 1953     I. PEYCHES     2,658,096

APPARATUS FOR THE MANUFACTURE OF MULTICELLULAR GLASS

Filed March 4, 1946

INVENTOR.

Ivan Peyches

BY

Dale A. Bauer
ATTORNEY.

Patented Nov. 3, 1953

2,658,096

UNITED STATES PATENT OFFICE 2,658,096

APPARATUS FOR THE MANUFACTURE OF MULTICELLULAR GLASS

Ivan Peyches, Paris, France, assignor to Societe Anonyme des Manufactures des Glaces et Produits Chimiques de Saint-Gobain, Chauny & Cirey, Paris, France Application March 4, 1946, Serial No. 651,775

Claims priority, application France March 5, 1945

2 Claims. (Cl. 13—6)

My invention refers to apparatus for the manufacture of multicellular glass.

A process performed by apparatus according to my invention consists in causing the formation of bubbles in a glass bath by overheating said bath in the neighbourhood of a surface immersed in it. Preferably the overheating is accomplished in such a way that the rise of temperature which it produces in the glass decreases as the distance from said surface increases. As a result gaseous bubbles are originated in the glass which is in contact with the surface, such bubbles rising through the bath and gathering in an upper zone, under such conditions that, at the place where the bubbles gather, there is obtained a glass full of bubbles of substantially the same size very regularly distributed throughout the mass.

This result may be explained by observing that each bubble, as soon as it is originated on the surface is, from that time, subjected on the one hand to an ascensional force tending to take it off from said surface, and on the other hand to a capillary force maintaining it in contact with said surface. When the bubble swells in contact with the surface, the ascensional force increases more rapidly than the capillary force. Such two forces become balanced when the bubble reaches a given diameter, so that, as soon as the bubble expands beyond such diameter, it takes off from the surface. All the bubbles rising in the bath have thus practically the same diameter. Consequently, when such bubbles successively get grouped together according to the laws of capillarity, they constitute, as a result of their equal dimensions, a regular network in the glass mass.

This process affords the advantage that it does not require any special glass composition, and that it may be used in combination with some known melting processes, without requiring any special equipment. Also it facilitates the easy withdrawal of the manufactured product. The bubbly and overheated glass rises by itself upward in the surrounding bath, thus creating a circuit in which it is easy to provide, at a convenient place, suitable withdrawal means.

For working out the process, resistors, flame tubes or other heating elements may be used for producing a suitable overheating of the glass in the neighbourhood of their surface.

In particular, when elaborating glass in an electric furnace by heating the bath by Joule effect in the mass, electrodes may be used to produce the overheating of the glass sheath around them if their diameter is so small that the energy developed in their immediate neighbourhood by volume unit will be sufficiently high. In practice good results are obtained with a power density on the order of 2 to 3 watts per cubic centimeter of glass.

The obtained bubbly glass may be collected by several usual processes, but also, in conformity with my invention, it is possible to use a particularly simple apparatus consisting of a vertical tube penetrating into the glass bath through the bottom of the receptacle and opening under the free surface in the upper part of the bath where the bubbly glass gathers.

The height of such tube may be regulated. The withdrawal may take place in a continuous way or intermittently by controlling the flow of bubbly glass in the tube by means of a device that will more or less completely close said tube.

For facilitating the withdrawal of the bubbly glass, the overheating of the glass may be accomplished in the part of the bath which is in contact with the exterior surface of the withdrawal tube. To that end said tube may, for instance, play the part of an electrode, at least on a portion of its external surface.

Several ways of carrying out the invention are shown on the accompanying drawings where:

Figure 1:
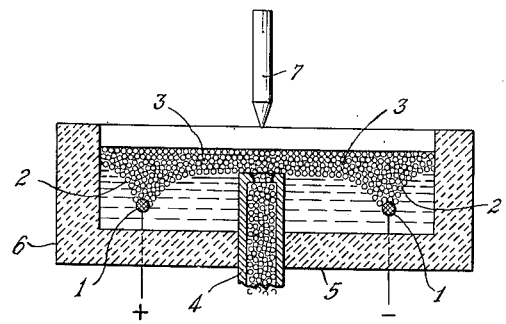
Fig. 1 is a vertical cross section of a furnace according to the invention.

In Fig. 1 the reference numeral 1 indicates electrodes of small diameter for heating the glass by Joule effect in the mass.

The bubbly glass 2, produced by overheating of the bath in contact with the electrodes, rises in the surrounding mass and gathers in the upper part 3 of the zone which is hatched on the figure. It then flows into a vertical tube 4 which penetrates through the bottom 5 of the tank 6 and opens under the free surface of the bath, in the upper part where the bubbly glass gathers. Such withdrawal tube may be regulated by a suitable device 7 able by adjustment to control or to stop the flow of the bubbly glass.

It is to be noted that to obtain the overheating, instead of electrodes other similarly placed heating bodies might be used such as, for instance, resistors, or flame tubes.

Figure 2:
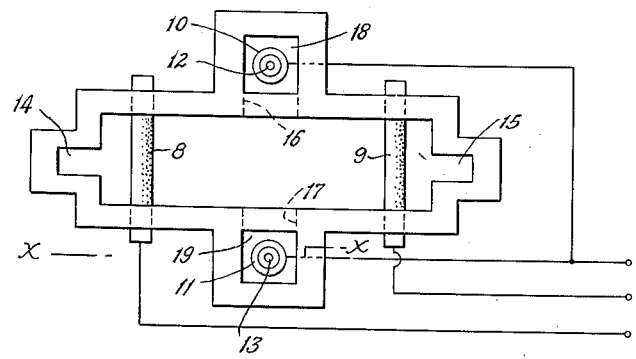
Fig. 2 is a horizontal view of another type of furnace embodying the invention when the bubbly glass is produced in the neighbourhood of the external surface of the withdrawal tube, the latter acting as an electrode on a portion of its external surface.
Figure 3:
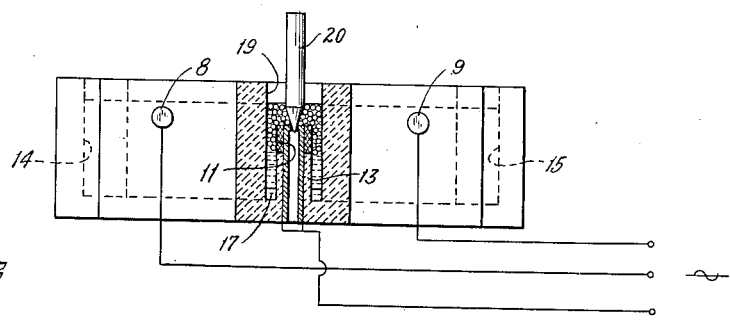
Fig. 3 is a vertical view, partly in cross section, along line $x$—$x$ of Fig. 2.

Figs. 2 and 3 which refer to an electric tank fed by three electrodes with three-phased current, show two electrodes 8 and 9 for melting, and a double electrode 10 and 11 for overheating the bath. The two melting electrodes have a comparatively large diameter. The overheating double electrode is constituted by a small portion of the surface of two withdrawal tubes 12 and 13. The raw materials are fed in the regions 14 and 15. The molten glass passes through orifices 16—17 located in the lower part of the bath, and thereafter comes into compartments 18—19 where it gets overheated in the neighbourhood of the double electrode 10 and 11. The bubbly glass rises in those compartments and it is withdrawn through the withdrawal tubes 12 and 13. The latter may be regulated by any device, such as shown at 20, able to control or to stop the flow of the bubbly glass.

In order to avoid a decrease of the volume of the bubbles during the beginning of the cooling or in order to expand them to obtain a very light product, the bubbly glass, immediately after its withdrawal from the tank, may be subjected to a certain degree of vacuum.

Together with the overheating effect, other actions may be employed, capable by themselves of causing the formation of bubbles. Such actions may be namely:

The electrolysis of the glass by a current of sufficiently low, or even null, frequency. Such current may be the same as the current heating the bath, or it may be an auxiliary current.

A chemical action caused by the nature of the surface producing the overheating, such chemical action being for example that a graphite surface in contact with the oxidizable material contained in the bath.

A physical action such as the injection of a gas or a vapor into the glass through the surface producing the overheating.

I claim:

1. Apparatus for the manufacture of multicellular glass comprising a tank, electrodes in the tank, a source adapted to supply said electrodes with sufficient current to keep the glass molten, doghouses on the tank, vertically arranged hollow electrodes in the doghouses connected to the said source having an area adapted to produce local overheating of the glass and having an opening beneath the surface of the glass in a position to receive only glass which has been overheated, passageways connecting the doghouses with the depths of the tank, and means to regulate the flow of glass into the hollow electrodes.

2. A glass furnace having a main tank and a doghouse connected thereto by a passage at the bottom of the tank, two electrodes of a three phase system in said tank, an electrode of said system in said doghouse, the said electrodes being proportioned to produce normal melting temperature in the tank and bubble forming temperature in the vicinity of the electrode in the doghouse, said doghouse electrode being tubular and extending from near the liquid level through the bottom of the tank and serving to draw off the bubbly glass that gathers on the surface of the liquid.

IVAN PEYCHES.

References Cited in the file of this patent

UNITED STATES PATENTS

| Number | Name | Date |
|---|---|---|
| 469,454 | Rogers | Feb. 23, 1892 |
| 698,766 | Voelker | Apr. 29, 1902 |
| 814,773 | Dixon et al. | Mar. 13, 1906 |
| 1,126,079 | Queneau | Jan. 26, 1915 |
| 1,928,288 | Henry | Sept. 26, 1933 |
| 1,928,289 | Henry et al. | Sept. 26, 1933 |
| 1,945,052 | Long | Jan. 30, 1934 |
| 1,999,974 | Wadman | Apr. 30, 1935 |
| 2,012,617 | Munters | Aug. 27, 1935 |
| 2,022,112 | Ferguson | Nov. 26, 1935 |
| 2,118,707 | Ingouf | May 24, 1938 |
| 2,122,469 | Hitner | July 5, 1938 |
| 2,143,951 | Lambert | Jan. 17, 1939 |
| 2,191,658 | Haux | Feb. 27, 1940 |
| 2,215,223 | Lytle | Sept. 17, 1940 |
| 2,233,631 | Miller et al. | Mar. 4, 1941 |
| 2,248,717 | Nash | July 8, 1941 |
| 2,255,236 | Willis | Sept. 9, 1941 |
| 2,261,022 | Fox et al. | Oct. 28, 1941 |
| 2,264,246 | Lytle | Nov. 25, 1941 |
| 2,272,930 | Black | Feb. 10, 1942 |
| 2,274,986 | Kilian et al. | Mar. 3, 1942 |
| 2,310,457 | Owen | Feb. 9, 1943 |
| 2,322,581 | Lytle | June 22, 1943 |
| 2,354,807 | Fox et al. | Aug. 1, 1944 |
| 2,397,852 | Gentil | Apr. 2, 1946 |
| 2,401,582 | Owen | June 4, 1946 |

FOREIGN PATENTS

| Number | Country | Date |
|---|---|---|
| 844,875 | France | May 1, 1939 |